(12) United States Patent
Tsuda et al.

(10) Patent No.: US 9,852,323 B2
(45) Date of Patent: *Dec. 26, 2017

(54) FACIAL IMAGE DISPLAY APPARATUS, FACIAL IMAGE DISPLAY METHOD, AND FACIAL IMAGE DISPLAY PROGRAM

(71) Applicants: Sony Interactive entertainment Inc., Tokyo (JP); Sony Corporation, Tokyo (JP)

(72) Inventors: Munetaka Tsuda, Tokyo (JP); Shuji Hiramatsu, Tokyo (JP); Akira Suzuki, Tokyo (JP)

(73) Assignees: SONY CORPORATION, Tokyo (JP); SONY INTERACTIVE ENTERTAINMENT, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,189

(22) Filed: Nov. 6, 2015

(65) Prior Publication Data

US 2016/0063311 A1 Mar. 3, 2016

Related U.S. Application Data

(63) Continuation of application No. 14/328,095, filed on Jul. 10, 2014, now Pat. No. 9,247,156, which is a (Continued)

(30) Foreign Application Priority Data

Aug. 12, 2005 (JP) .................. 2005-234739

(51) Int. Cl.
*G06K 9/00* (2006.01)
*G06T 13/80* (2011.01)
*H04N 5/262* (2006.01)

(52) U.S. Cl.
CPC ...... *G06K 9/00228* (2013.01); *G06K 9/00261* (2013.01); *G06K 9/00288* (2013.01);
(Continued)

(58) Field of Classification Search
CPC .......... G06K 9/00228; G06K 9/00221; G06K 9/00288; G06K 9/00281; G06K 9/00248;
(Continued)

(56) References Cited

U.S. PATENT DOCUMENTS 4,276,570 A 6/1981 Burson et al.
6,025,879 A 2/2000 Yoneyama et al.
(Continued)

FOREIGN PATENT DOCUMENTS

CN 1630360 6/2005
EP 1235182 A2 8/2002
(Continued)

OTHER PUBLICATIONS

International Search Report dated Oct. 17, 2006 from the corresponding PCT/JP2006/315144.
(Continued)

*Primary Examiner* — Abderrahim Merouan
(74) *Attorney, Agent, or Firm* — Katten Muchin Rosenman LLP

(57) ABSTRACT

The present invention provides a facial image display apparatus that can display moving images concentrated on the face when images of people's faces are displayed. A facial image display apparatus is provided wherein a facial area detecting unit (21) detects facial areas in which faces are displayed from within a target image for displaying a plurality of faces; a dynamic extraction area creating unit (22) creates, based on the facial areas detected by the facial area detecting means, a dynamic extraction area of which at least one of position and surface area varies over time in the
(Continued)

target image; and a moving image output unit (27) sequentially extracts images in the dynamic extraction area and outputs the extracted images as a moving image.

11 Claims, 5 Drawing Sheets

Related U.S. Application Data continuation of application No. 11/663,677, filed as application No. PCT/JP2006/315144 on Jul. 31, 2006, now Pat. No. 8,803,886.

(52) U.S. Cl.
CPC ........... *G06T 13/80* (2013.01); *H04N 5/2628* (2013.01); *G06K 9/00221* (2013.01); *G06K 9/00248* (2013.01); *G06T 2207/30201* (2013.01)

(58) Field of Classification Search
CPC ................ G06K 9/00261; G06T 13/80; G06T 2207/302; H04N 5/2628
See application file for complete search history.

(56) References Cited

U.S. PATENT DOCUMENTS

| | | | |
|---|---|---|---|
| 6,044,168 A | 3/2000 | Tuceryan et al. | |
| 6,184,926 B1 | 2/2001 | Khosravi et al. | |
| 6,362,850 B1 | 3/2002 | Alsing et al. | |
| 6,504,546 B1 | 1/2003 | Cosatto et al. | |
| 6,580,811 B2 * | 6/2003 | Maurer | G06K 9/00228 348/169 |
| 6,587,119 B1 | 7/2003 | Anderson et al. | |
| 6,828,972 B2 | 12/2004 | Zhang et al. | |
| 6,883,140 B1 | 4/2005 | Acker et al. | |
| 6,919,892 B1 * | 7/2005 | Cheiky | G06T 13/40 345/473 |
| 6,930,687 B2 | 8/2005 | Grosvenor et al. | |
| 7,020,305 B2 | 3/2006 | Liu et al. | |
| 7,027,054 B1 | 4/2006 | Cheiky et al. | |
| 7,209,601 B2 | 4/2007 | Manabe | |
| 7,212,674 B1 | 5/2007 | Takemoto | |
| 7,274,822 B2 * | 9/2007 | Zhang | G06F 17/30265 382/224 |
| 7,317,815 B2 | 1/2008 | Steinberg et al. | |
| 7,453,506 B2 | 11/2008 | Li | |
| 7,469,054 B2 | 12/2008 | Aratani et al. | |
| 7,602,949 B2 * | 10/2009 | Simon | G06K 9/00234 348/606 |
| 7,706,575 B2 | 4/2010 | Liu et al. | |
| 7,808,555 B2 | 10/2010 | Aratani et al. | |
| 2001/0033675 A1 | 10/2001 | Maurer et al. | |
| 2002/0118287 A1 * | 8/2002 | Grosvenor | G06T 13/80 348/222.1 |
| 2002/0181784 A1 | 12/2002 | Shiratani | |
| 2003/0189654 A1 | 10/2003 | Kage et al. | |
| 2004/0086157 A1 | 5/2004 | Sukegawa | |
| 2004/0100487 A1 | 5/2004 | Mori et al. | |
| 2004/0170337 A1 * | 9/2004 | Simon | G06K 9/00234 382/254 |
| 2004/0240708 A1 | 12/2004 | Hu et al. | |
| 2004/0240740 A1 | 12/2004 | Ohba | |
| 2005/0046730 A1 | 3/2005 | Li | |
| 2005/0107127 A1 | 5/2005 | Moriya | |
| 2005/0128221 A1 | 6/2005 | Aratani et al. | |
| 2005/0147304 A1 | 7/2005 | Nagahashi et al. | |
| 2005/0219642 A1 | 10/2005 | Yachida et al. | |
| 2006/0109283 A1 * | 5/2006 | Shipman | G06F 3/04815 345/629 |
| 2006/0114327 A1 | 6/2006 | Araya et al. | |
| 2006/0188130 A1 | 8/2006 | Park et al. | |
| 2006/0204054 A1 | 9/2006 | Steinberg et al. | |
| 2006/0204055 A1 * | 9/2006 | Steinberg | H04N 5/23212 382/118 |
| 2006/0209087 A1 | 9/2006 | Takeshima et al. | |
| 2006/0239645 A1 | 10/2006 | Curtner et al. | |
| 2007/0296833 A1 * | 12/2007 | Corcoran | H04N 5/23248 348/231.99 |
| 2008/0309662 A1 * | 12/2008 | Hassner | G06K 9/20 345/419 |

FOREIGN PATENT DOCUMENTS

| | | |
|---|---|---|
| JP | 11-73512 | 3/1999 |
| JP | 2002-92626 | 3/2002 |
| JP | 2002-215180 | 7/2002 |
| KR | 10-2005-0060628 | 6/2005 |

OTHER PUBLICATIONS

Notice of Preliminary Rejection dated Jun. 19, 2008 for corresponding Korean Patent Application No. 10-2007-7010813.
Chinese Office Action dated Aug. 21, 2009 from corresponding Application No. 200680001078.9.
Notice of Rejection dated Mar. 23, 2010 from corresponding Japanese Application No. 2006-551132.
Korean Notice of Preliminary Rejection dated Jun. 14, 2011 from corresponding Application No. 10-2009-7000862.
U.S. Office Action dated Jan. 14, 2014 from U.S. Appl. No. 11/663,677.
U.S. Office Action dated Jun. 20, 2013 from U.S. Appl. No. 11/663,677.
U.S. Office Action dated Apr. 24, 2013 from U.S. Appl. No. 11/663,677.
U.S. Office Action dated Jan. 17, 2013 from U.S. Appl. No. 11/663,677.
U.S. Office Action dated Jul. 19, 2012 from U.S. Appl. No. 11/663,677.
U.S. Office Action dated Jan. 20, 2012 from U.S. Appl. No. 11/663,677.
U.S. Office Action dated Jun. 24, 2011 from U.S. Appl. No. 11/663,677.
U.S. Office Action dated Feb. 2, 2011 from U.S. Appl. No. 11/663,677.
U.S. Office Action dated Oct. 14, 2010 from U.S. Appl. No. 11/663,677.
Notice of Allowance dated Mar. 28, 2014, from the corresponding U.S. Appl. No. 11/663,677.
U.S. Office Action dated May 11, 2010 from U.S. Appl. No. 11/663,677.
Notice of Allowance dated Sep. 18, 2015, from the corresponding U.S. Appl. No. 14/328,095.
U.S. Office Action dated Apr. 10, 2015, from the corresponding U.S. Appl. No. 14/328,095.
Extended European Search Report dated Sep. 25, 2017 for the Corresponding European Patent Application No. 06782022.5.

\* cited by examiner

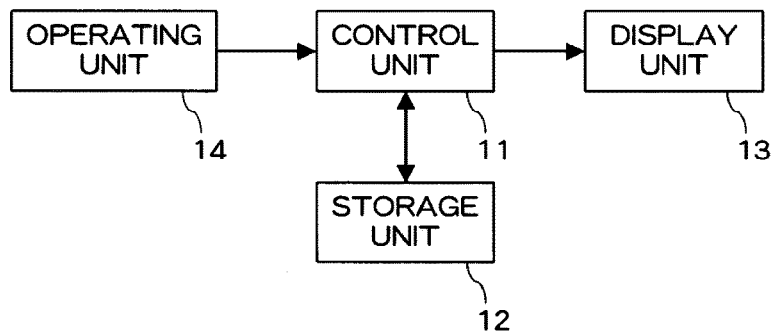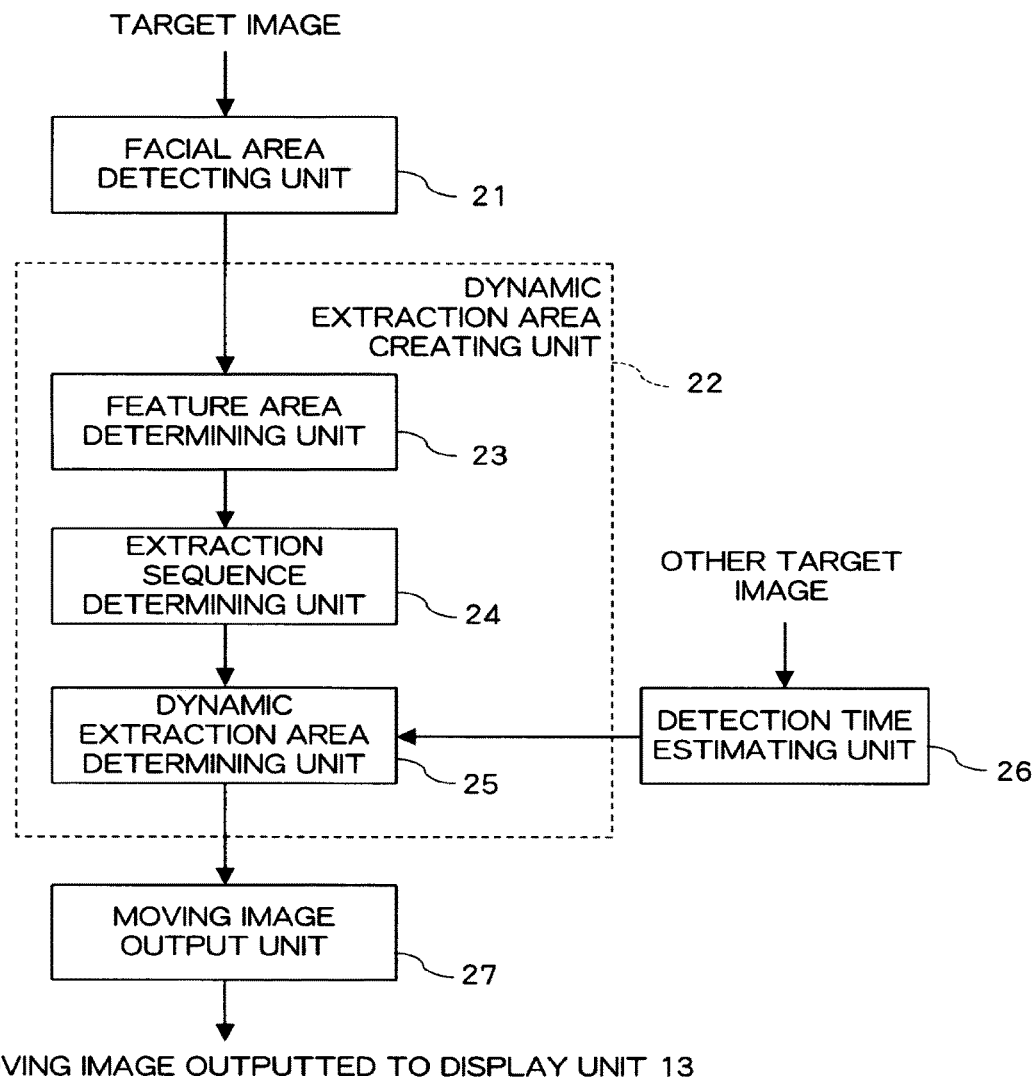

FACIAL IMAGE DISPLAY APPARATUS, FACIAL IMAGE DISPLAY METHOD, AND FACIAL IMAGE DISPLAY PROGRAM

TECHNICAL FIELD

The present invention relates to a facial image display apparatus, a facial image display method, and a facial image display program for displaying images of people's faces.

BACKGROUND ART

Generally, in cases in which an image display apparatus displays image data for a photograph of a person or the like, the entire image is displayed. Also, the display of images as a moving image that follows a movement sometimes involves methods such as displaying a degenerated image while gradually brightening the entire image, and displaying the entire image by gradually zooming out the image from a specific position.

DISCLOSURE OF THE INVENTION

Problems the Invention Is Intended to Solve

However, in the conventional example given above, a moving image that emphasizes the contents of the images cannot be created, and is therefore relatively dull and not entertaining to the user. Another problem is that the user's attention is drawn to areas in the image having relatively little importance.

The present invention was designed in view of these circumstances, and an object thereof is to provide a facial image display apparatus, a facial image display method, and a facial image display program that can display moving images concentrated on the face when images of people's faces are displayed.

Means for Solving these Problems

The facial image display apparatus according to the present invention, which is intended to resolve these problems, comprises facial area detecting means for detecting facial areas in which faces are displayed from within a target image for displaying a plurality of faces; dynamic extraction area creating means for creating, on the basis of the facial areas detected by the facial area detecting means, a dynamic extraction area of which at least one of position and surface area varies over time in the target image; and moving image output means for sequentially extracting images in the dynamic extraction area and outputting the extracted images as a moving image.

The facial image display method according to the present invention is a method that a computer is used for executing a step for detecting facial areas in which faces are displayed in a target image for displaying a plurality of faces; a step for creating, on the basis of the facial areas detected by the facial area detecting means, a dynamic extraction area of which at least one of position and surface area varies over time in the target image; and a step for sequentially extracting images in the dynamic extraction area and outputting the extracted images as a moving image.

The facial image display program according to the present invention is a program that a computer is caused to function as facial area detecting means for detecting facial areas in which faces are displayed from within a target image for displaying a plurality of faces; dynamic extraction area creating means for creating, on the basis of the facial areas detected by the facial area detecting means, a dynamic extraction area of which at least one of position and surface area varies over time in the target image; and moving image output means for sequentially extracting images in the dynamic extraction area and outputting the extracted images as a moving image.

An information recording medium according to the present invention is an information recording medium that can be read by a computer and that stores a program that causes a computer to function as facial area detecting means for detecting facial areas in which faces are displayed from within a target image for displaying a plurality of faces; dynamic extraction area creating means for creating, on the basis of the facial areas detected by the facial area detecting means, a dynamic extraction area of which at least one of position and surface area varies over time in the target image; and moving image output means for sequentially extracting images in the dynamic extraction area and outputting the extracted images as a moving image.

BRIEF DESCRIPTION OF THE DRAWINGS

FIG. 1 is a block diagram showing the configuration of the facial image display apparatus according to an embodiment of the present invention;

FIG. 2 is a function block diagram showing the functions of the facial image display apparatus according to an embodiment of the present invention;

BEST MODE FOR CARRYING OUT THE INVENTION

Figure 3:
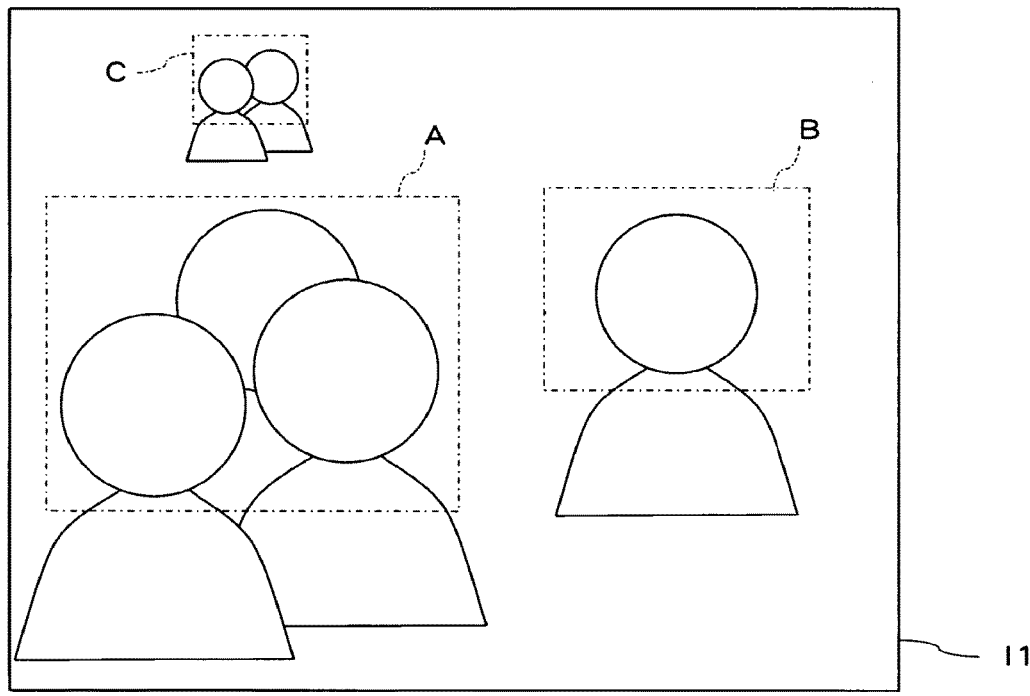
FIG. 3 is a schematic depiction of an example of a target image, which is processed by the facial image display apparatus according to an embodiment of the present invention.

In a facial image display apparatus according to one embodiment of the present invention, facial area detecting means detects facial areas in which faces are displayed from within a target image that displays multiple faces. Dynamic extraction area creating means then creates, on the basis of the facial areas detected by the facial area detecting means, a dynamic extraction area of which at least one of position and surface area varies over time in the target image. Furthermore, moving image output means sequentially extracts images in the dynamic extraction area and outputs the extracted images as a moving image.

The facial image display apparatus according to the present embodiment is thereby capable of outputting moving images concentrated on facial areas.

In this arrangement, the dynamic extraction area creating means may include feature area determining means for determining feature areas including one or more facial areas, extraction sequence determining means for determining the sequence of extracting the feature areas on the basis of specific conditions, and dynamic extraction area determining means for determining the dynamic extraction area on the basis of the feature areas and the extraction sequence.

Furthermore, in the case described above, the extraction sequence determining means may determine the extraction sequence on the basis of at least one of the number of faces displayed in the feature areas, the size of the feature areas, and the position of the feature areas in the target image.

The facial image display apparatus according to the present embodiment is thereby capable of outputting moving image that display the feature areas in a sequence corresponding to the characteristics of feature areas including facial areas.

The dynamic extraction area determining means may determine the dynamic extraction area so that position thereof in the target image vary over time along a movement path that is determined on the basis of the positions of the feature areas in the target image.

The facial image display apparatus according to the present embodiment is thereby capable of outputting a moving image that sequentially display parts of the target image while moving in accordance with the feature areas containing facial areas.

The facial image display apparatus according to the present embodiment may further include detection time estimating means for estimating the time needed for the facial area detecting means to detect facial areas in one or multiple other target images in cases in which the moving image output means outputs the moving images on the basis of a plurality of target images. The moving image output means may output the moving image over a time duration determined on the basis of the detection time estimated by the detection time estimating means, and the facial area detecting means may detect facial areas contained in said one or multiple other target images during the period in which the moving image is outputted by the moving image output means.

The facial image display apparatus according to the present embodiment is thereby capable of outputting moving images that continuously display the feature areas displayed in multiple target images, without having the user wait depending on the time needed for facial areas to be detected.

In the facial image display apparatus according to the present embodiment, the dynamic extraction area creating means may select a moving image pattern from among specific moving image pattern options on the basis of at least one of the number of detected facial areas, the size of the detected facial areas, and the position of the facial areas in the target image. The dynamic extraction area creating means may then create the dynamic extraction area on the basis of the selected pattern, and the moving image output means may output a moving image based on the selected pattern.

The facial image display apparatus according to the present embodiment is thereby capable of outputting a moving image in a pattern corresponding to the detected facial areas.

Preferred embodiments of the present invention are described hereinbelow with reference to the diagrams.

The facial image display apparatus according to an embodiment of the present invention comprises a control unit 11, a storage unit 12, a display unit 13, and an operating unit 14, as shown in FIG. 1.

In this arrangement, the control unit 11 is configured from a CPU, for example, and is used to execute a program stored in the storage unit 12. The storage unit 12 comprises RAM, ROM, or another such memory element and/or disk device. The storage unit 12 stores the program that is executed by the control unit 11, and data on the target image to be processed in the present embodiment. The storage unit 12 also operates as working memory for the control unit 11.

The display unit 13 is a display or the like, for example, and displays images according to instructions outputted from the control unit 11. Upon receiving an instruction operation from the user, the operating unit 14 outputs the contents of the instruction operation to the control unit 11. The operating unit 14 may be a keyboard, a mouse, a controller for a game console, or the like.

The facial image display apparatus according to the present embodiment is functionally configured including a facial area detecting unit 21, a dynamic extraction area creating unit 22, a detection time estimating unit 26, and a moving image output unit 27, as shown in FIG. 2.

The facial area detecting unit 21 first acquires the target image to be processed in the present embodiment. The target image may be stored in the storage unit 12, or may be acquired by a communication unit (not shown) via a network. The facial area detecting unit 21 then detects image areas in which faces are displayed as facial areas from within the target image.

Specifically, in cases in which a facial area is detected as a rectangular area, for example, the position and size of the facial area are determined using the sizes of the pixels of the target image as units, and this information is stored in the storage unit 12. In this case, a point in the upper left or in the center of the rectangular area, for example, is used as a representative point of the facial area, and the position of the facial area is determined as position coordinates for the representative point in the target image. The size of the facial area is determined as two values, which are the width and height of the rectangular area. In cases in which a facial area is detected as a circular area, the center point of the circular area is used as a representative point and the size is determined as one value representing the radius of the circle. Another option is that the facial area be determined as an elliptical area. In this case, the center of the ellipse is used as a representative point, and the size of the facial area is specified by values representing the radii of the major and minor axes.

The method whereby the facial area detecting unit 21 detects facial areas is not particularly limited, and various techniques can be used. For example, the facial area detecting unit 21 may detect facial areas by using statistical data pertaining to a facial shape pattern acquired in advance through a study. In cases in which facial areas are detected using this manner of statistical method, the facial areas are detected, and a likelihood value is obtained pertaining to the possibility that the detected areas actually contain components representing a face. This value is somewhat representative of the likeness of the area to a face, and this facial likeness value may be used later by an extraction sequence determining unit 24. The orientation of the face may be determined from the facial shape pattern, and this information may be used later by the extraction sequence determining unit 24.

Furthermore, in addition to detecting facial areas, the facial area detecting unit 21 may perform a process of identifying the faces contained in the areas. If the user has already registered facial information regarding person's face to which previously detected facial area corresponds, the facial area detecting unit 21 can identify the person's face in the detected facial area by eigenface method or another such face-identifying technique, for example. This information can be used later when the extraction sequence determining unit 24 determines the extraction sequence of the feature areas. In cases in which photographic images of the user's family are displayed, for example, it is possible to determine whether or not the display of each person in the photographs should be carried out according to the person, and also to display the images by using a display sequence or display method that corresponds to each person.

The facial area detecting unit 21 may also acquire attribute information pertaining to the attributes of the detected facial areas. This attribute information contains information pertaining to the youth (age) of the people displayed in the facial areas and information pertaining to the people's expressions, for example. Specifically, the facial area detecting unit 21 can acquire this attribute information by inferring the youth and expressions of the people in the facial areas. This is done on the basis of the results of a frequency analysis for the facial areas, and on the basis of the positional relationship among feature points (positions of the eyes, nose, mouth, and the like) contained in the facial areas, for example. This attribute information is used later when the extraction sequence determining unit 24 determines the extraction sequence of the feature areas. It is thereby made possible to perform processes for displaying moving images concentrated on facial areas representing children's faces, for example.

The dynamic extraction area creating unit 22 creates dynamic extraction area on the basis of the facial areas detected by the facial area detecting unit 21. The dynamic extraction area is an area in the target image wherein the position and/or surface area vary over time, and the dynamic extraction area is specified by information involving a correlation between time and the positions and sizes in the target image. The moving image output unit 27 acquires images to be displayed in the outputted moving image by clipping target images on the basis of the dynamic extraction area. The facial image display apparatus according to the present embodiment is capable of outputting moving images concentrated on the facial areas by determining the dynamic extraction area on the basis of the facial areas.

The following is a description of an example of a case in which the dynamic extraction area creating unit 22 determines image areas containing one or more facial areas to be feature areas, and then creates dynamic extraction area from which feature areas are extracted in a sequence based on specific conditions. In this case, the dynamic extraction area creating unit 22 is functionally configured including a feature area determining unit 23, an extraction sequence determining unit 24, and a dynamic extraction area determining unit 25.

The feature area determining unit 23 determines feature areas by grouping facial areas according to specific conditions as necessary. These facial areas are detected by the facial area detecting unit 21. The feature areas are image areas contained in the target image in which one or more faces are displayed. The feature areas are specified by values representing positions and sizes in the target image, similar to the facial areas.

The following is an example of a method for grouping multiple facial areas. Specifically, in cases in which two facial areas overlap, the group is determined to be the same in cases in which the surface areas of the overlapping portions are equal to or greater than a specific threshold. The group may otherwise be determined to be the same merely if any areas overlap. If the representative points of two facial areas are denoted by P and Q, the group may be determined to be the same when the distance between P and Q is equal to or less than a specific threshold. Two facial areas may also be determined to be in the same group in cases in which either the distance between the adjacent sides is equal to or less than a specific threshold, or the distance is equal to or less than a value determined from a specific ratio relating to the sizes of the facial areas. The adjacent sides herein are a set of two sides in which the distance between the side of one facial area and the side of another facial area is smallest, and which are selected from sides constituting the external peripheries of the two facial areas (sides of a rectangle that circumscribes the facial areas in cases in which the facial areas are circular or elliptical). The feature area determining unit 23 determines the feature areas on the basis of one or more facial areas that are determined to belong to the same group according to these conditions. The feature areas may be of a size that includes all of the target facial areas, or a size that includes at least a specific percentage of the facial areas. The feature areas may also be of a size that includes areas equivalent to a specific number of pixels surrounding the facial areas. Otherwise, the size of the feature areas may be determined according to the orientation of the faces contained in the facial areas so that areas below the faces, for example, are included proportionate to a number of pixels determined according to a specific ratio relating to the size of the facial areas. It is thereby possible to determine feature areas including people's faces from the chest up, for example. In cases of an image area in which a feature area contains only one facial area, the shape and size of the feature area may coincide with the facial area.

In cases in which the feature area determining unit 23 determines a feature area containing a single facial area, the size of the feature area may be determined according to the size of the facial area contained in the feature area. For example, in cases in which the feature area determining unit 23 uses, as a feature area, an area containing areas proportionate to a specific number of pixels surrounding the facial area as previously described, this specific number of pixels is determined based on the size of the facial area. As a specific example, the feature area determining unit 23 determines the specific number of pixels to be a smaller value as the facial areas become larger, and a greater value with as the facial areas become smaller. The sizes of the feature areas determined by the feature area determining unit 23 will then be relatively similar and will be devoid of nonuniformities comparable to the sizes of the facial areas detected by the facial area detecting unit 21. It is thereby possible to prevent the size of the dynamic extraction area from rapidly changing over time in cases in which the dynamic extraction area determining unit 25 determines dynamic extraction area that correspond to a moving image pattern that is zoomed in on the feature areas, for example, as is described later.

The feature area determining unit 23 determines feature areas so that the parts that represent faces contained in the target image are included in either of the feature areas. For example, in the target image I1 depicted schematically in FIG. 3, a feature area A containing three facial areas, a feature area B containing one facial area, and a feature area C containing two facial areas are obtained. The dynamic extraction area creating unit 22 then creates dynamic extraction area so that the feature areas are extracted based on a specific sequence in accordance with the following process.

The extraction sequence determining unit 24 determines the feature areas to be extracted by the moving image output unit 27 from among the feature areas determined by the feature area determining unit 23, sorts the feature areas to be extracted on the basis of specific conditions, and determines the extraction sequence.

Specifically, the extraction sequence determining unit 24 calculates score values for each of the feature areas, for example, on the basis of values representing the characteristics of the feature areas. These score values are then used as a basis to determine whether or not the feature areas are to be extracted, and to determine the sequence with which the feature areas will be extracted. The score values can be calculated based on the number of faces displayed in the feature areas, the surface areas of the feature areas, or other such factors. Also, the score values may be determined using values pertaining to the facial likenesses, information pertaining to whose face is displayed, and other such information obtained by the facial area detecting unit 21 for the facial areas included in the feature areas.

The extraction sequence determining unit 24 may also determine the score values on the basis of the attribute information acquired by the facial area detecting unit 21 for the facial areas contained in the feature areas.

Furthermore, the score values may be calculated using a combination of information pertaining to the feature areas. For example, in cases in which the score values are calculated based on the number of faces displayed in the feature areas and the surface areas of the feature areas, the score values can be calculated from the following formulas, wherein the score values of the feature areas A, B, C in the target image I1 are $SC_A$, $SC_B$, $SC_C$.

$$SC_A = (S_A \times a1) + (N_A \times a2)$$

$$SC_B = (S_B \times a1) + (N_B \times a2)$$

$$SC_C = (S_C \times a1) + (N_C \times a2)$$

The symbols $N_A$, $N_B$, $N_C$ are the numbers of faces displayed in the feature areas A, B, C, and the symbols $S_A$, $S_B$, $S_C$ are values representing the surface areas of the feature areas A, B, C. The symbols a1, a2 are weighting factors determined in advance.

After the score values for the feature areas are calculated, the extraction sequence determining unit 24 determines the extraction sequence. Specifically, the feature areas are sorted according to the score value, for example, and are extracted according to the sorted sequence. The feature areas may also be excluded from being extracted for score values equal to or less than a specific threshold. For example, in the example given above, if the relationships $SC_A > SC_B > SC_C$, $SC_B > SC_{min}$, and $SC_{min} \geq SC_C$ hold for a specific threshold $SC_{min}$, the extraction sequence determining unit 24 excludes the feature area C from the target to be processed by the dynamic extraction area determining unit 25, and determines an extraction sequence so that the feature areas A, B are extracted with this sequence. In the case of images of scenic photographs, for example, it is thereby possible to exclude small faces in the scenery from the targets to be processed.

Instead of determining the extraction sequence according to the score values, the extraction sequence determining unit 24 may determine the extraction sequence according to information pertaining to the orientation of the faces or the positions of the feature areas. In this case, the extraction sequence may be determined so that extraction begins with the feature areas on the left side of the target image, for example. Also, in some cases it is possible to acquire information pertaining to the distance from the camera to the photographed subject in the target image on the basis of information pertaining to a focus or on the basis of overlapping of the photographed images. In such cases, a sequence of aligning the facial areas from the front to the rear, or from the rear to the front, may be determined based on this information, and the extraction sequence may be determined according to this sequence. The extraction sequence may also be determined randomly regardless of this type of information on the feature areas. Furthermore, score values may be calculated for the feature areas in the same manner as the previously described example, and feature areas in which the score values are equal to or less than a specific threshold value may be removed from the target to be extracted by the moving image output unit 27, even when the extraction sequence is determined regardless of the score values.

The following is a description of a specific example of a method for determining the extraction sequence on the basis of the positions of the feature areas. For example, the extraction sequence determining unit 24 excludes feature areas contained in a specific range of the target image from the targets of extraction. In this case, feature areas near the external periphery of the target image, for example, can be ignored in the creation of the dynamic extraction area. The extraction sequence determining unit 24 may detect the two feature areas farthest from each other from among the feature areas that have not been excluded from the target of extraction, and the extraction sequence determining unit 24 may then determine the extraction sequence so that one of these two feature areas is extracted first, and the other is extracted last.

In addition to determining the feature areas to be extracted, the extraction sequence determining unit 24 may reset the feature areas so that the facial areas contained in two or more feature areas to be extracted are contained in one feature area in cases in which the feature areas to be extracted fulfill specific conditions. When the number of feature areas to be extracted is equal to or less than a specific number, for example, the position and size of a feature area is set instead so that all of the facial areas are contained in the feature area. Alternatively, in cases in which the distance between the representative points of two certain feature areas is equal to or less than a specific threshold, a feature area may be set instead so as to include all of the facial areas contained in these two feature areas. It is thereby possible to extract more preferable feature areas in accordance, for example, with cases in which there are few feature areas to be extracted, or the like.

The dynamic extraction area determining unit 25 determines dynamic extraction area in the target image of which the position and/or surface area vary over time. The determination is made on the basis of the feature areas determined by the feature area determining unit 23 and the extraction sequence determined by the extraction sequence determining unit 24. Specifically, the dynamic extraction area is determined so that the feature areas are extracted according to the extraction sequence. The dynamic extraction area determining unit 25 determines the dynamic extraction area on the basis of the pattern of the moving image outputted by the moving image output unit 27. The shape of the dynamic extraction area is determined according to the pattern of the moving image.

The dynamic extraction area determining unit 25 determines the position and surface area of the dynamic extraction area as follows in cases in which the pattern of the moving image outputted by the moving image output unit 27 is based on the below-described morphing process or a fade-in/fade-out process. Specifically, the position and surface area in the target image are determined so as to include a feature area corresponding to the first extraction sequence. And, the dynamic extraction area is determined so as to change the position and surface area in the target image and include a feature area corresponding to the next extraction sequence after a time duration determined by specific conditions has passed. These steps are repeated to sequentially change the dynamic extraction area to position and surface area containing feature areas in accordance with the extraction sequence determined by the extraction sequence determining unit 24.

The above-described time duration may be a predetermined time, or may be determined based on a reference output time $T_{min}$ in which the entire moving image created based on the target image is outputted. The reference output time $T_{min}$ may be a predetermined time, or a time determined based on the number of displayed feature areas. The time duration may also be determined based on the reference output time $T_{min}$ and an estimated time calculated by the below-described detection time estimating unit 26.

Another example of a pattern for the moving image outputted by the moving image output unit 27 is one in which a moving image that moves through the target image is outputted by moving the dynamic extraction area along a movement path determined based on the positions of the feature areas in the target image. Hereinbelow a detailed description is given of the process whereby the dynamic extraction area determining unit 25 determines the dynamic extraction area in this case.

First, the dynamic extraction area determining unit 25 determines the movement path for moving the dynamic extraction area in the target image. The movement path is determined so as to pass through the representative points of the feature areas in the sequence determined by the extraction sequence determining unit 24, for example. The movement path may be a broken line that connects the representative points in a straight line, or a spline curve that passes through the representative points. The movement path may also be determined using a Bezier curve, but in this case, the Bezier curve must be corrected at the end so that the dynamic extraction area passes through the feature areas. The moving image output unit 27 can thereby output a moving image that displays the feature areas in a specific sequence, because the dynamic extraction area determining unit 25 determines the dynamic extraction area so as to pass through the feature areas to be extracted according to a specific sequence.

Figure 4:
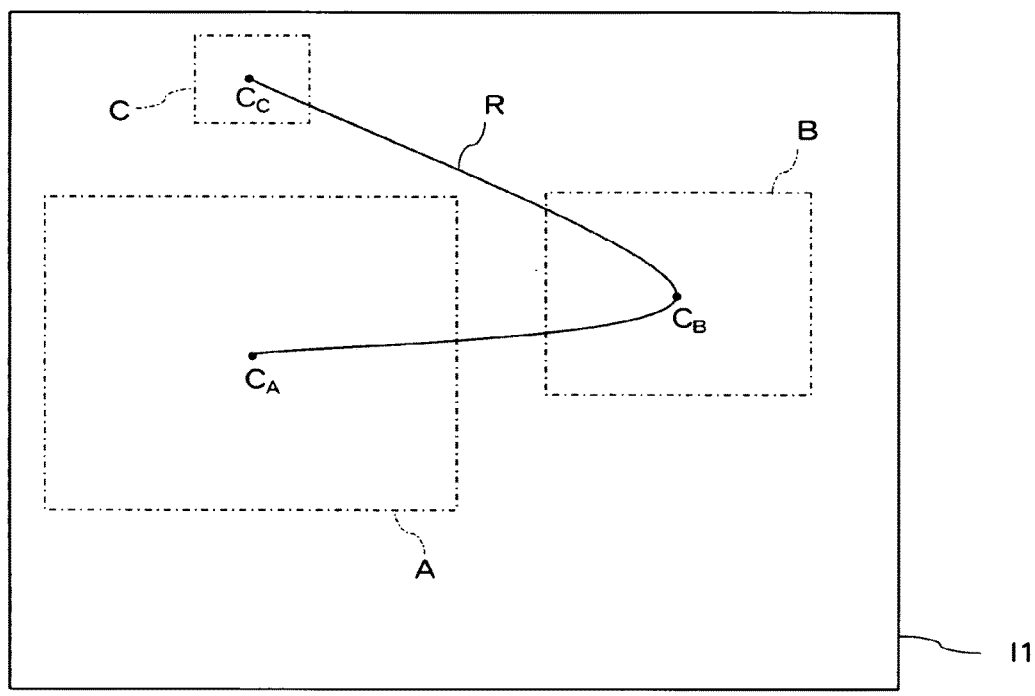
FIG. 4 is a diagram showing an example of the movement path of a dynamic extraction area in a target image in a case in which the dynamic extraction area determining unit determines a movement path.

FIG. 4 is a diagram showing an example of the movement path when the feature areas A, B, C are displayed in this order in the example of the target image I1 shown in FIG. 3. In this diagram, the representative points of the feature areas A, B, C are $C_A$, $C_B$, $C_C$, respectively, and the movement path constitutes a curved line R that joins these three points. The dynamic extraction area is determined so as to move along the movement path R through the points in the order $C_A$, $C_B$, $C_C$.

The movement path does not necessarily need to pass through the representative points of the feature areas. For example, the movement path may be determined so that the distance h to the movement path is equal to or less than a specific threshold for all points on the external peripheries of the feature areas. The size of the dynamic extraction area is then determined based on the maximum distance $h_{max}$ of these distances h. The moving image output unit 27 is thereby capable of outputting a moving image displaying the feature areas by sequentially acquiring images clipped from the dynamic extraction area. This can be achieved even when the movement path does not pass through the representative points of the feature areas.

Figure 5:
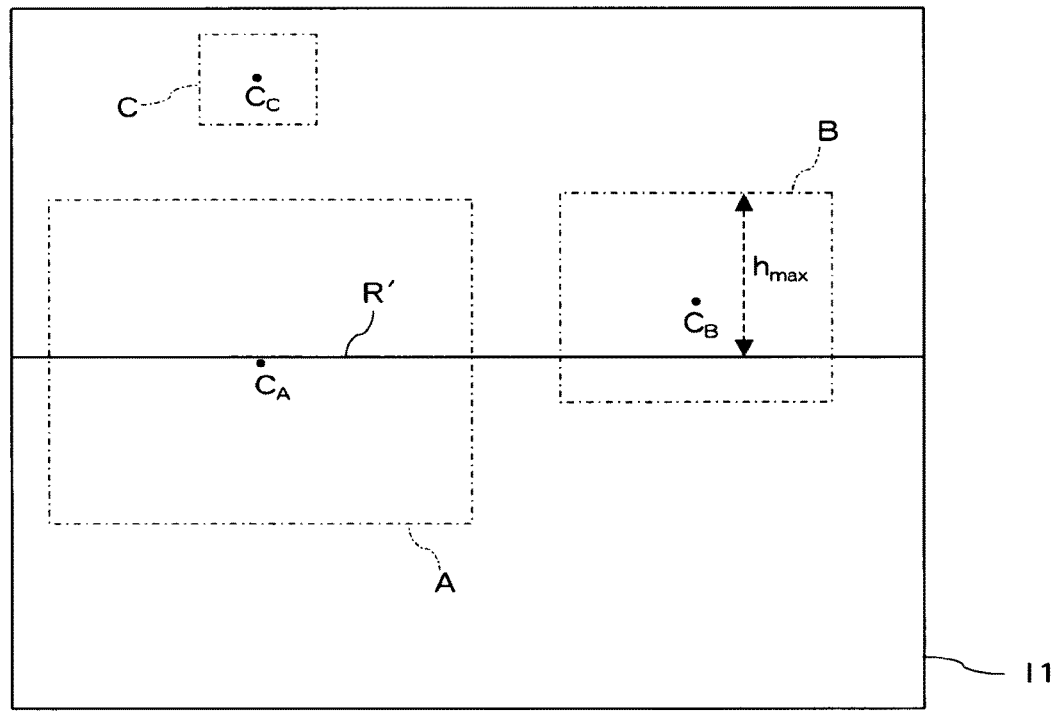
FIG. 5 is a diagram showing another example of the movement path of a dynamic extraction area in a target image in a case in which the dynamic extraction area determining unit determines a movement path.

Specifically, the positions of the representative points is approximated by a straight line, for example, the straight line is translated to make the maximum distance $h_{max}$ as small as possible, and the resulting straight line is used as the movement path. It is thereby possible to output a moving image displaying the feature areas by moving the dynamic extraction area along this straight line in cases in which the feature areas are aligned along a substantially straight line, and the extraction sequence determining unit 24 has determined the extraction sequence of the feature areas on the basis of the positions of the feature areas. FIG. 5 is a diagram showing an example of a rectilinear movement path R' in the case of the target image I1 shown in FIG. 3, wherein the feature area C is not to be extracted and the feature areas A, B are to be displayed in this order. The movement path R' is determined so as to pass through the middle between the lower border of the feature area A and the upper border of the feature area B, and the maximum distance $h_{max}$ corresponds to the distance between the movement path R' and the upper border of the feature area B, and also to the distance between the movement path R' and the lower border of the feature area A. In this case, the dynamic extraction area is determined as rectangular area whose longitudinal dimension is equal to two times $h_{max}$.

When the movement path is determined, the dynamic extraction area determining unit 25 determines the dynamic extraction area so that the position of the dynamic extraction area is sequentially varied along the movement path. Specifically, when the representative point of the dynamic extraction area is set to the area center point in the same manner as the feature areas, the position of the dynamic extraction area is sequentially varied so that the representative point move through the aforementioned movement path. The initial position of the dynamic extraction area may be the same as the position of the first feature area to be displayed, or the position may be the point where the movement path intersects the external periphery of the target image. When the initial position is the point where the movement path intersects the external periphery of the target image, the moving image output unit 27 begins extracting the image starting with the periphery of the target image.

In cases in which the dynamic extraction area determining unit 25 sequentially varies the position of the dynamic extraction area, the speed with which the dynamic extraction area moves through the movement path is represented by the length of the path through which the position of the dynamic extraction area moves from the extraction of one image to the next. This dynamic extraction area speed may be set in advance or may be calculated by a specific method. Specifically, the speed is calculated by dividing the length of the movement path from one feature area to the next by the number of frame images outputted by the moving image output unit 27 during a predetermined output time T, for example. In this case, the dynamic extraction area moves at a constant speed through the movement path from one feature area to the next.

Figure 6:
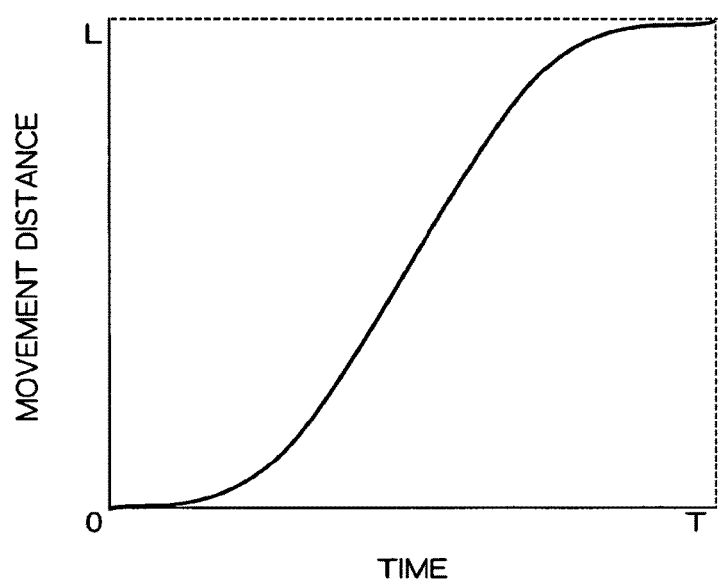
FIG. 6 is a graph schematically depicting an example of the movement speed of a dynamic extraction area in a case in which the dynamic extraction area determining unit determines a dynamic extraction area on the basis of the movement path.

The speed through the movement path may also be calculated so as to lengthen the time during which areas in the vicinity of the feature areas are displayed. Specifically, the speed through the movement path is determined according to the schematic graph shown in FIG. 6 in cases in which the dynamic extraction area is moved from the feature area A to the feature area B, for example. The horizontal axis of the graph represents the time taken to move from the feature area A to the feature area B, wherein time 0 is the point at which the dynamic extraction area is positioned at the representative point of the feature area A, and time T is the point at which the dynamic extraction area is positioned at the representative point of the feature area B. The vertical axis represents the distance through the movement path from the feature area A to the feature area B, wherein the movement distance 0 is the position of the feature area A, and the movement distance L is the position of the feature area B. In the example of the movement path shown in FIG. 4, the length of the curved line R between point $C_A$ and point $C_B$ corresponds to L. The graph in FIG. 6 has a gentle slope near the movement distances 0 and L, and a steep slope near the middle. Therefore, when the dynamic extraction area is determined based on the movement distance determined according to this graph, the dynamic extraction area moves through the vicinities of the feature areas at a lower speed, and moves through positions distant from the feature areas at a higher speed. It is thereby possible to output a moving image that, in particular, moves slowly through the vicinities of faces while moving through the target image, and to obtain a display that concentrates on faces to a greater degree. The speed of the dynamic extraction area may be determined according to the graph when the first and last feature areas are extracted, and the speed of the dynamic extraction area may be determined so that the area moves at a constant speed when the feature areas in the middle are extracted.

The output time T, which represents the time taken by the dynamic extraction area to move from one feature area to the next, may be a specific time or may be determined based on the value of the movement distance L. The output time T may also be determined based on the estimated time calculated by the detection time estimating unit 26, described later.

In addition to sequentially changing the position of the dynamic extraction area, the dynamic extraction area determining unit 25 may also sequentially change the size of the dynamic extraction area so that the dynamic extraction area is large enough to include the feature areas. For example, a feature area is assumed to be rectangular, and the size of the feature area A is represented by a width $w_A$ and a height $h_A$, while the size of the feature area B is represented by a width $w_B$ and a height $h_B$. In this case, a dynamic extraction area is moved from the feature area A to the feature area B while, at the same time, the width of the dynamic extraction area gradually changes from $w_A$ to $w_B$ and the height of the dynamic extraction area gradually changes from $h_A$ to $h_B$. It is possible to output a moving image in which the display range of the target image changes in accordance with the sizes of the feature areas. This is achieved by clipping the target image at dynamic extraction area that has changed in size. The amount of change in the widths and heights in this case may be determined to be always constant or to vary in accordance with the movement speed of the dynamic extraction area.

In some cases, the facial image display apparatus according to the present embodiment detects facial areas from multiple target images, and continuously outputs moving images created based on the facial areas. In such cases, the detection time estimating unit 26 estimates the time needed to detect the facial areas contained in one or more target images. The following is a description of examples of continuous outputs of moving images created based on two target images I1, I2, respectively. A moving image A1 is an image obtained by sequentially extracting images in the dynamic extraction area created based on the target image I1, and a moving image A2 is an image obtained by sequentially extracting images in the dynamic extraction area created based on the target image I2. The detection time estimating unit 26 first estimates the time needed to detect facial areas in the target image I2. The resulting estimated time $T_{next}$ is then used to adjust the output time when the dynamic extraction area creating unit 22 determines the output time of the moving image A1, which is outputted by the moving image output unit 27 immediately before the moving image A2.

Specifically, the detection time estimating unit 26 calculates an estimated time on the basis of the file size, resolution, or another attribute of the target image, for example. The estimated time may also be calculated according to a coarse recognition process that easily recognizes faces in the target image beforehand at a low resolution. Furthermore, the detection time estimating unit 26 may estimate the time of processes needed to begin outputting the moving image A2 for the target image I2 other than the process for the facial area detection by the facial area detecting unit 21, such as the process for the facial areas to be grouped to determine the feature areas, and the process to determine the sequence with which the determined feature areas are extracted. These times may be included in the calculated estimated time $T_{next}$.

The time estimating unit 26 is not limited to being used for the target image outputted subsequent to the moving image currently being outputted by the moving image output unit 27 as the target for calculating the estimated time. For example, estimated times for multiple target images are calculated in cases in which the processes for detecting facial areas in two or more target images are performed in parallel. Thus, estimated times are calculated for processes pertaining to one or more target images yet to be displayed.

The following is a description of controlling the output time of a moving image in a case in which the moving image output unit 27 continuously outputs moving images A1, A2 that display facial areas detected from the two target images I1, I2. When the reference output time $T_{min}$ for outputting a moving image A1 based on the target image I1 falls below the estimated time $T_{next}$ needed to detect facial areas for the next moving image A2, the dynamic extraction area creating unit 22 uses $T_{next}$ as the output time for the moving image A1. The moving image output unit 27 executes a process for outputting the moving image A1 while, at the same time, the facial area detecting unit 21 performs a process for detecting facial areas in the subsequently displayed target image I2. It is thereby possible to make the preparations necessary to output the moving image A2 before the output of the moving image A1 is complete, and moving images can be continuously displayed without having the user wait.

The detection time estimating unit 26 may update the estimation of the remaining time needed to detect facial areas in the target image I2 at one or more specific timings. The estimation may be updated even while the moving image output unit 27 is still in the process of outputting the moving image A1 on the basis of the estimated time for the next target image that has already been calculated. This re-calculated estimated time is used any time to adjust the remaining output time for the moving image A1 being outputted by the moving image output unit 27. In this case, the remaining output time for the moving image is adjusted as a result of the dynamic extraction area creating unit 22 recreating the dynamic extraction area on the basis of the re-calculated estimated time.

Specifically, in cases in which the remaining output time for the moving image A1 is $T_{now}$ at a certain point in time so that $T_{rest} > T_{now}$, for example, the dynamic extraction area determining unit 25 makes adjustments so that the remaining output time for the moving image A1 is greater than $T_{rest}$ by revising the dynamic extraction area so that the time at each position is increased when the dynamic extraction area changes position. The wait time for the user to view the moving images can thereby be eliminated by appropriately adjusting the output time of the moving image A1 even in cases in which the process for the moving image A2 requires more than the initial estimated time.

Furthermore, in some cases, facial area detection and other processes for the next target image I2 require more than the estimated time calculated by the detection time estimating unit 26. As a result, output of the next moving image A2 cannot begin at the point when output of the moving image A1 is completed. In such cases, the moving image output unit 27 may either wait in its current state until the necessary processes are completed, or may repeatedly output the moving image A1. Another option is to output a moving image having another pattern in which the facial areas contained in the target image I1 are displayed.

In some cases, the pattern for a moving image in which dynamic extraction area is moved along a movement path requires more time than the estimated time initially calculated for the facial areas to be detected in the next target image. In such cases, adjusting the movement speed of the dynamic extraction area can increase the output time of the current moving image. Another option is to increase the output time of the current moving image A1 by changing the movement path in the target image I1 so as to increase the distance over which the dynamic extraction area moves.

The moving image output unit 27 sequentially extracts images in the dynamic extraction area by clipping the target image on the basis of the dynamic extraction area created by the dynamic extraction area creating unit 22. The extracted images are then processed as necessary based on a specific moving image pattern to create a moving image, and this moving image is outputted to the display unit 13.

The following is an example of a pattern of a moving image outputted by the moving image output unit 27. Specifically, first, an image is extracted from a dynamic extraction area containing the feature area that is first in the extraction sequence, and then an image is created in which this first image is gradually changed to an image containing the second feature area by a morphing process. Images created in this manner are sequentially displayed, resulting in a moving image in which each image gradually changes to an image in the dynamic extraction area containing the next feature area. A moving image that sequentially displays the feature areas can be outputted by repeating this sequence while changing the position and surface area of the dynamic extraction area to the positions and surface areas containing feature areas.

The moving image pattern may also cause the images containing feature areas to fade in and out. In this case, first, an image is extracted from a dynamic extraction area containing the feature area that is first in the extraction sequence, this image is faded out, and then an image is sequentially outputted in which the second feature area in the extraction sequence is faded in. A moving image that sequentially displays feature areas can be outputted by repeating this sequence while changing the position and surface area of the dynamic extraction area to the positions and surface areas containing feature areas, similar to the pattern for the morphing process. In this case, the fade-in/fade-out effect is achieved by gradually changing the brightness of the extracted images, for example. The moving image may also be designed so that the extracted feature areas are made transparent by gradually increasing the transparency of the image, and the transparency of the next feature area is gradually reduced from a completely transparent state.

In the pattern for moving dynamic extraction area along the movement path, a moving image can be outputted that moves through target images in which images extracted from the dynamic extraction area are either outputted directly without being processed, or are outputted in an enlarged or compressed format.

The size of the dynamic extraction area normally changes over time on the basis of the size of the feature areas, but in cases in which the moving image output unit 27 sequentially outputs images extracted from the dynamic extraction area, another option is for images acquired by clipping to be enlarged or compressed in accordance with the size of images that can be displayed by the display unit 13, whereby images of the same size can be displayed on the display unit 13.

The pattern used by the moving image output unit 27 may be either selected by the user or selected randomly from the multiple moving image patterns described above. Another possibility is for the pattern to be determined based on the number of displayed feature areas. For example, a fade-in/fade-out pattern may be used to display the moving image when the number of displayed feature areas is equal to or greater than a specific number, and the moving image may be displayed by moving the dynamic extraction area when the number of displayed feature areas is less than the specific number.

A moving image based on a specific pattern so that the entire target image is displayed may be outputted in cases in which the target image either does not contain any feature areas to be extracted or contains only one feature area to be extracted. Furthermore, a target image that does not contain feature areas may be excluded from the moving images outputted by the moving image output unit 27.

According to the embodiment of the present invention described above, a moving image created by concentrating on facial areas can be displayed when images representing faces are displayed.

In the present embodiment, the feature area determining unit 23 to determine feature areas by grouping facial areas, but the feature area determining unit 23 need not be included. In such cases, a moving image concentrated on faces can be displayed by executing the processes of the present embodiment while using the facial areas detected by the facial area detecting unit 21 as feature areas each representing one face.

Figure 7:
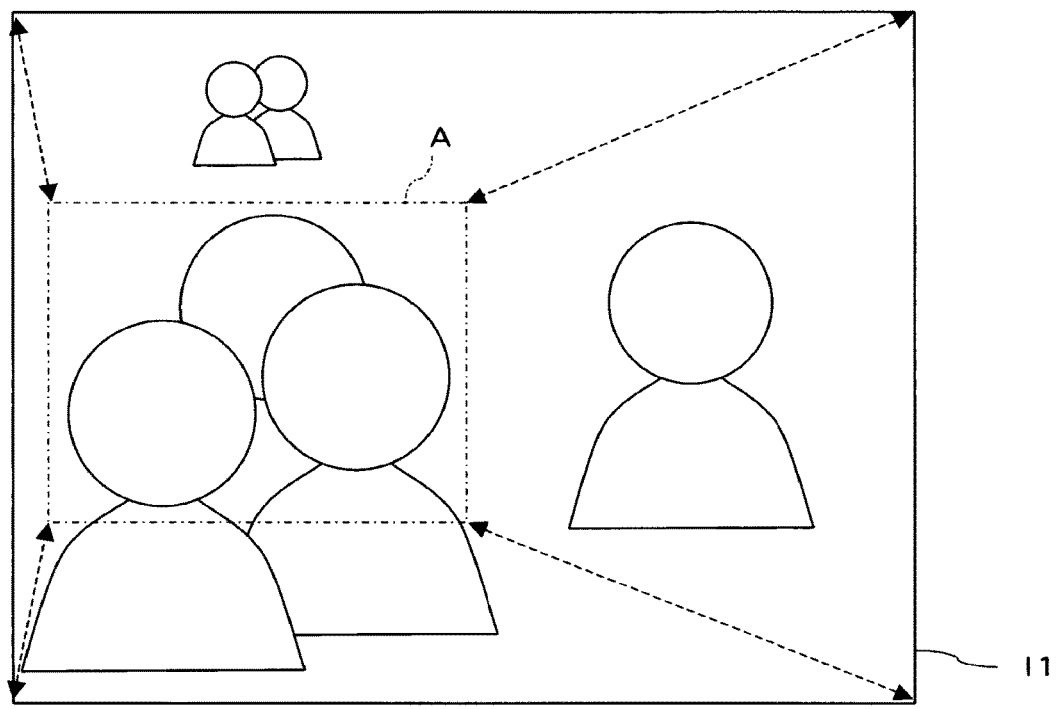
FIG. 7 is a diagram showing an example of a dynamic extraction area determined by the dynamic extraction area determining unit.

In addition to the moving image patterns described above, the facial image display apparatus according to the present embodiment is also capable of outputting moving images having the following pattern. Specifically, a zoom-in/zoom-out pattern may be used for one or more feature areas containing facial areas. In this case, the dynamic extraction area determining unit 25 first determines the position and surface area of the dynamic extraction area so as to include the entire target image. The dynamic extraction area is then determined so that the position and surface area of the dynamic extraction area is gradually changed to the smallest size capable of containing the first feature area to be extracted. For example, in the target image I1 displayed schematically in FIG. 7, when the user wishes to output a moving image that zooms in on the feature area A, the dynamic extraction area is gradually changed from an area encompassing the entire target image to an area encompassing only the feature area A. The arrows displayed with dashed lines in the diagram indicate the extent to which the dynamic extraction area is changed in the target image. The position and surface area of the dynamic extraction area are then gradually changed in the opposite manner to a size including the entire target image. Furthermore, in the case in which multiple feature areas are to be extracted, the dynamic extraction area is determined so as to repeat the described change in proportion to the number of feature areas. The moving image output unit 27 enlarges the images in the dynamic extraction area determined by the dynamic extraction area determining unit 25 to a specific size regardless of the size of the dynamic extraction area, and outputs the enlarged images. It is thereby possible to output a moving image that displays feature areas according to a zoom-in/zoom-out pattern.

The facial image display apparatus according to the present embodiment may also be designed to output a moving image for each target image with either a zoom in or a zoom out pattern alone.

Figure 8:
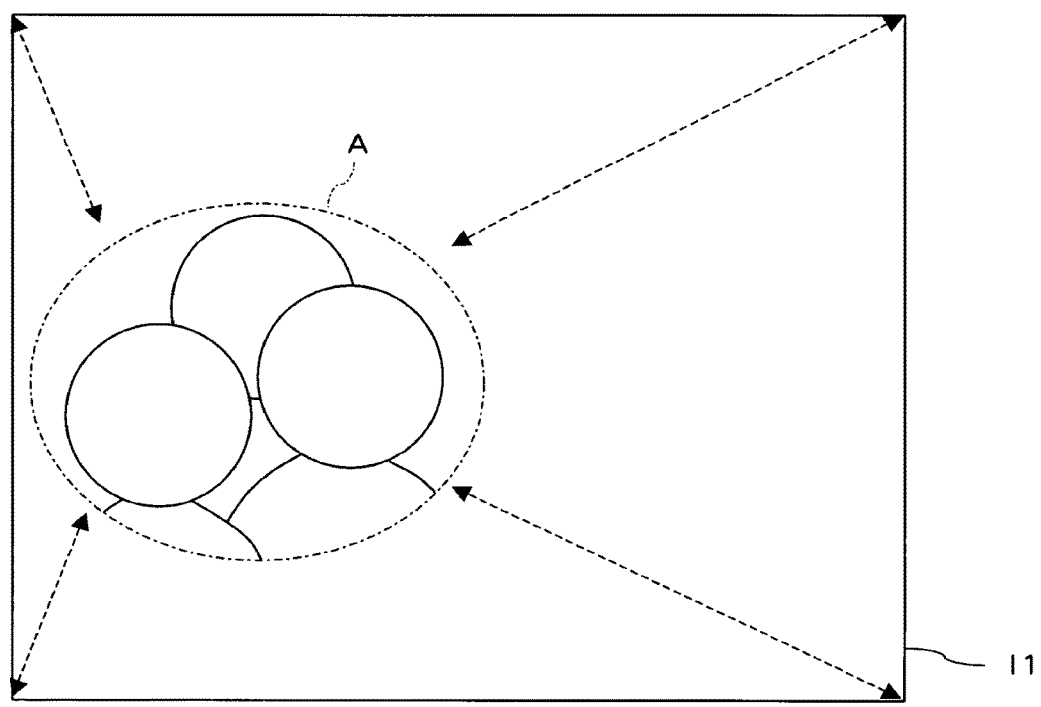
FIG. 8 is a diagram showing an example of an image outputted by the moving image output unit.

Another example of a moving image pattern is a wipe-in/wipe-out pattern that may be used for one or more feature areas. In this case, the dynamic extraction area is determined in the same manner as in the zoom-in/zoom-out pattern. The moving image output unit 27 creates outputted images in the following manner. Specifically, the outputted image is of the same size as the entire target image I1, the image in the dynamic extraction area is displayed in the outputted image without changing the position and surface area of the dynamic extraction area, and the other area is filled out with black or another specific color. These images are sequentially created and outputted along with the change in the dynamic extraction area. For example, when the display wipes in on the feature area A in the target image I1, an image is outputted such as is shown schematically in FIG. 8. In this diagram, the arrows displayed with dashed lines represent the process of change in the dynamic extraction area. The feature area and dynamic extraction area have an elliptical shape in the illustrated example. It is thereby possible to output a moving image that displays feature areas with a wipe-in/wipe-out pattern.

The facial image display apparatus according to the present embodiment may be designed to output a moving image for each target image with either a wipe-in or a wipe-out pattern alone when.

Another example of a moving image pattern that may be used to output moving images is a moving image pattern that uses the Lens Blur effect. For example, in this moving image pattern, the dynamic extraction area is determined in the same manner as in the wipe-in/wipe-out pattern described above. The moving image output unit 27 creates outputted images as follows. Specifically, the outputted image is of the same size as the entire target image I1, the image in the dynamic extraction area is displayed in the outputted image without changing the position and surface area of the dynamic extraction area, and the image in the other area is the image corresponds to the target image I1 with specific image processing. This specific image processing creates a Lens Blur effect in the other area. Specifically, with respect to each pixel in the area, the average value of the pixel values for that pixel and its surrounding pixels is calculated, and the pixel values are replaced with the calculated averages. The image in area other than the dynamic extraction area thereby goes out of focus and takes on a blurry appearance.

The moving image output unit 27 may gradually vary the specific parameters used in the image processing for creating the Lens Blur effect. For example, the moving image output unit 27 repeats the process of creating outputted images while increasing the range of the surrounding pixels whose average pixel values are calculated. The moving image output unit 27 is thereby capable of outputting moving images in which areas other than the feature areas appear to go out of focus. This type of moving image pattern allows for a display in which areas that do not display faces go out of focus, whereby areas displaying faces stand out. In this moving image pattern using a Lens Blur effect, the dynamic extraction area may be a fixed area that corresponds to a single selected feature area and does not change in position or size.

The following is a description of another example of the process whereby the facial image display apparatus according to the present embodiment selects a moving image pattern from the moving image patterns previously described.

For example, the dynamic extraction area creating unit 22 selects a moving image pattern from specific moving image pattern options on the basis of at least one of the number of facial areas detected by the facial area detecting unit 21, the sizes of the facial areas, and the positions of the facial areas within the target image. The dynamic extraction area creating unit 22 then creates dynamic extraction area on the basis of the selected pattern. The moving image output unit 27 subjects the dynamic extraction area to clipping and image processing on the basis of the moving image pattern selected by the dynamic extraction area creating unit 22, and a moving image is outputted.

In this case, specific examples of the pattern options that can be selected by the dynamic extraction area creating unit 22 include the previously described moving image pattern (panning image pattern) in which the dynamic extraction area is moved along a movement path, a moving image pattern that uses a morphing process, a fade-in/fade-out moving image pattern, a zoom-in/zoom-out moving image pattern, a wipe-in/wipe-out moving image pattern, a moving image pattern that uses a Lens Blur effect, and the like. One of the pattern options may also be a combination of these moving image patterns. For example, the pattern option may be a moving image pattern that zooms in on the feature area while a Lens Blur effect is applied to the areas outside of the feature area.

Specifically, the dynamic extraction area creating unit 22 selects a moving image pattern from options that include a panning image pattern when, for example, multiple facial areas are detected, and the dynamic extraction area creating unit 22 selects a moving image pattern from options that do not include a panning image pattern when only one facial area is detected.

A moving image pattern may also be selected from these options even when no facial areas are detected. In this case, the dynamic extraction area creating unit 22 may create dynamic extraction area not on the basis of feature areas, but rather, for example, on the basis of the center position of the target image, or on the basis of a reference position selected randomly from specific position options.

The dynamic extraction area creating unit 22 may randomly select a moving image pattern from the selectable pattern options. The moving image pattern may also be selected according to the moving image pattern used in the moving image outputted by the moving image output unit 27 prior to the upcoming moving image. For example, the dynamic extraction area creating unit 22 may select a different moving image pattern than the one used in the moving image outputted immediately prior to the upcoming moving image, and may use this selected moving image pattern for the upcoming moving image. It is thereby possible to avoid a continuous moving image based on the same pattern as when moving images based on the target images are continuously outputted, and monotonous displays can be prevented.

The facial image display apparatus according to the present embodiment may perform the following process when displaying moving images based on multiple target images. Specifically, the moving image output unit 27 outputs a moving image in which an image outputted during a specific time at the end of the currently displayed moving image is gradually reduced in brightness, and the moving image fades out. The image during a specific time at the beginning of the subsequently displayed moving image is then gradually increased in brightness, and the moving image fades in.

Alternatively, the moving image output unit 27 may combine semi-transparent displays of the outputted image during a specific time at the end of the currently displayed moving image, and the outputted image during a specific time at the beginning of the subsequently displayed moving image. In this case, the two outputted images may be combined while the transparency of the outputted image in the currently displayed moving image is gradually increased, and the transparency of the outputted image in the subsequently displayed moving image is gradually reduced. A moving image can thereby be displayed wherein the currently displayed moving image fades out while, at the same time, the subsequently displayed moving image fades in.

The invention claimed is:

1. A facial image display apparatus comprising:
 a memory, one or more processors configured to execute instructions stored on said memory to embody:
 a detector that detects areas containing faces in a plurality of target images each displaying one or more faces, wherein each target image is a still image, wherein the detector identifies one or more persons corresponding to the areas containing faces and creates, using the areas containing faces, a path through the plurality of target images connecting the detected areas containing faces according to the one or more identified persons;
 and a moving image creating unit that creates a moving image in which a camera moves through the plurality of target images according to the path, wherein the moving image contains the areas containing faces from the plurality of target images, wherein the moving image creating unit selects a pattern from among specific moving image pattern options for the path based on the number of detected facial areas.

2. The facial image display apparatus according to claim 1, wherein the detector further acquires attribute information pertaining to the areas containing faces.

3. The facial image display apparatus according to claim 2, wherein the attribute information comprises information pertaining to an age or an expression corresponding to each of the areas containing faces.

4. The facial image display apparatus according to claim 2, wherein the detector creates the path based on the acquired attribute information pertaining to the areas containing faces.

5. The facial image display apparatus according to claim 4, wherein the detector creates the path according to an age of the one or more identified persons.

6. The facial image display apparatus according to claim 1, wherein the moving image zooms in on the detected facial areas.

7. The facial image display apparatus according to claim 1, further comprising: a time estimator that estimates a time needed to detect facial areas in each of the plurality of target images, wherein the facial image display apparatus outputs the moving image on a display on the basis of the plurality of target images, and wherein a time duration of the moving image is determined on the basis of the detection time estimated by the time estimator.

8. The facial image display apparatus according to claim 1, wherein the path comprises a sequence of the detected areas containing faces of the plurality of target images according to one of the one or more identified persons.

9. The facial image display apparatus according to claim 8, wherein the moving image zooms in on the detected facial areas of the plurality of target images according to the sequence.

10. A facial image display method executed on a computer comprising:
 detecting areas containing faces in a plurality of target images each displaying one or more faces, wherein each target image is a still image;
 automatically identifying one or more persons corresponding to the areas containing faces and creating, using the areas containing faces, a path through the plurality of target images connecting the detected areas containing faces according to the one or more identified persons;
 and creating a moving image in which a camera moves through the plurality of target images according to the path, wherein the moving image contains the areas containing faces from the plurality of target images,
 wherein a pattern from among specific moving image pattern options for the path based on the number of detected facial areas.

11. A non-transitory computer readable medium having stored thereon a program comprising the steps of:
 detecting areas containing faces in a plurality of target images each displaying one or more faces, wherein each target image is a still image;
 automatically identifying one or more persons corresponding to the areas containing faces and creating, using the areas containing faces, a path through the plurality of target images connecting the detected areas containing faces according to the one or more identified persons; and
 creating a moving image in which a camera moves through the plurality of target images according to the path, wherein the moving image contains the areas containing faces from the plurality of target images,
 wherein a pattern from among specific moving image pattern options for the path based on the number of detected facial areas.

* * * * *